United States Patent [19]

Shurman et al.

[11] Patent Number: 4,627,479
[45] Date of Patent: Dec. 9, 1986

[54] TIRE CONSTRUCTION UTILIZING LOW-TWIST BODY PLY YARN WITH HIGH TURN-UP ENDS

[75] Inventors: Louis W. Shurman, Canton; Thomas W. Bell, Mogadore, both of Ohio

[73] Assignee: The Firestone Tire & Rubber Company, Akron, Ohio

[21] Appl. No.: 675,260

[22] Filed: Nov. 27, 1984

[51] Int. Cl.⁴ ............................................. B60C 15/06
[52] U.S. Cl. ................................. 152/541; 152/546; 152/554; 152/556
[58] Field of Search ............... 152/359, 362 R, 354 R, 152/356 R, 541, 554, 556, 546

[56] References Cited

U.S. PATENT DOCUMENTS

| | | | |
|---|---|---|---|
| T948,013 | 7/1976 | Brownlee | 152/359 |
| 1,424,020 | 7/1922 | Hopkinson | |
| 1,608,102 | 11/1926 | Jury | |
| 2,125,633 | 8/1938 | Harrison | 117/2 |
| 2,273,200 | 2/1942 | Hoff | 152/359 |
| 2,309,564 | 1/1943 | Anderson et al. | 57/153 |
| 3,253,639 | 5/1966 | Travers | 152/362 |
| 3,395,529 | 8/1968 | Ray | 152/359 |
| 3,682,223 | 8/1972 | Simpson | 152/362 R |
| 3,736,973 | 6/1973 | Mezzanotte | 152/354 R |
| 3,774,663 | 11/1973 | Montagne | 152/362 R |
| 3,841,378 | 10/1974 | Hamacher et al. | 152/362 R |
| 4,202,393 | 5/1980 | Ikeda et al. | 152/330 RF |
| 4,231,409 | 11/1980 | Mezzanotte | 152/354 R |
| 4,261,405 | 4/1981 | Yamauchi et al. | 152/330 RF |
| 4,263,957 | 4/1981 | Abe | 152/359 |
| 4,265,292 | 5/1981 | Inoue | 152/354 R |
| 4,349,061 | 9/1982 | Hirakawa et al. | 152/209 R |

Primary Examiner—Michael Ball
Attorney, Agent, or Firm—Ernst H. Ruf

[57] ABSTRACT

A pneumatic radial ply tire in which the body ply is formed of a low twist yarn having between two and five turns-per-inch. The body ply terminates in relatively high turn-up ends extending along the side walls a distance between 35% and 65% of the tire section height and out of the area of cyclic stress and oscillation in the side walls of the tire. A relatively high, narrow and hard bead filler is located within a bead portion of the tire and has a height between 20% and 50% of the tire section height with a width of between 5% and 25% of the bead filler height. The bead filler has a hardness of between 75 and 98 on the Shore A scale. The ply yarn preferably is Nylon and the individual low twist strands are arranged in a parallel relationship and is preferably free of transverse cross strands known as wefts or picks. The combination of low twist yarn, high turn-up body ply ends and bead filler size and hardness provides a tire having increased durability and uniformity at a lower cost.

9 Claims, 6 Drawing Figures

TIRE CONSTRUCTION UTILIZING LOW-TWIST BODY PLY YARN WITH HIGH TURN-UP ENDS

TECHNICAL FIELD

The invention relates to pneumatic tires and particularly to radial ply tires primarily for use with passenger vehicles. More particularly, the invention relates to such a pneumatic tire utilizing a low-twist body ply yarn in combination with a particular size and hardness of bead filler and body ply turnup height to provide increased uniformity and durability by reducing the stress in the body sidewall area, and at a lower cost.

BACKGROUND ART

It is always desirable to reduce the cost of manufacturing pneumatic tires especially those intended for passenger vehicle use even a slight amount, due to the large number of tires produced and the resulting overall savings achieved thereby. However, it is necessary to maintain and preferably improve the ride characteristics and performance of the tire or maintain the present status thereof while reducing the manufacturing costs.

One of the main elements of a pneumatic radial ply tire construction is the body carcass which generally is made of organic fiber, e.g., polyamide, polyester, Nylon or the like. Heretofore, the body carcass of the majority of passenger tires use twisted yarn having a degree of twist generally in the area of 10 or more twists per inch. A plurality of these twisted yarns then were intertwined to form a twisted cord which formed the body ply. These twisted cords then are arranged in a generally parallel relationship with respect to each other and are interconnected by transversely extending cross threads referred to as wefts or picks. Although this construction forms a strong body carcass, it increased the cost due to the large amount of material which is required to produce the high twist yarns and ultimate twist cords. Also, the high twist cords and weft strands provide nonuniformity to the carcass body which may affect the ride achieved by the final tire construction.

Another problem present in passenger vehicle tires, especially in radial tires by virtue of the flexibility in the side walls to provide a soft comfortable ride, is that the flexibility of the side walls tends to reduce the lateral stability and cornering property of such tires. The cyclic loading that is experienced by the side wall of the tire during one revolution or footprint of the tire results in compression and tension loadings in the turn-up region of the side wall and body ply cords therein providing an area of cyclic strain or oscillation in the side wall. This strain can result in fatigue of the ply cords and possible subsequent separation in the side wall area. This problem is amplified where the turn-up ends of the body carcass or ply terminate in the cyclic or oscillation zone of the side wall.

The importance of the location of the turn-up ends of the body ply has been recognized in the prior art and the problems encountered therewith by its loosening from the side wall while providing sufficient length to insure anchoring of the ply on the steel bead core wires, and that the length of the turn-up ends effects the overall tire characteristic. For example, U.S. Pat. No. 3,774,663 attempts to solve this problem by inserting additional plies extending about the bead core to provide longer and higher turn-up ends instead of continuing the main body ply cords to the longer desired termination point, and in which the connecting body extensions include rubber having a modulus of elasticity higher than the rubber connecting the cords of the main carcass body.

The construction of U.S. Pat. No. 4,231,409 attempts to eliminate this problem of fatigue in the side wall of a radial tire due to the difference in stiffness existing between the side wall and the material surrounding the bead wire core, as well as the effect of the turn-up distance of the carcass body ply ends by the addition of two additional layers of textile cords located in the side wall area where the relatively large cyclical load or oscillation occurs, especially when the tire rotates at high speeds. In the tire construction of this patent the turn-up ends extend to about 15% of the tire section height and the bead filler has a Shore hardness of 90° which extends to 18% of the section height.

This excessive flexing problem in the side wall of radial tires also was recognized in U.S. Pat. No. 3,253,639 which attempts to solve the problem by restricting the height of the turn-up ends of the body ply to a height of between 8% and 25% of the tire section height in combination with a reinforcing ply terminating below the top of the turn-up ends in the bead area. This problem of the turn-up body ply ends in the area of flexing stress and oscillation also is recognized in U.S. Pat. No. 4,265,292 which attempts to solve the problem by providing a steel chafer which is located outside of the turn-up ends in combination with a particular type of organic fiber material located outside of the steel chafer, with the turn-up ends of the main body ply terminating below the height of the steel chafer.

U.S. Pat. No. 3,682,223 shows a tire construction which attempts to eliminate the stresses in a radial tire, especially in the bead area, by providing a bead filler of a relatively hard material having a hardness of between 75 and 95 durometer, in combination with a pair of cushioning rubber strips adjacent the main bead filler of various hardness less than that of the main bead filler. In this construction the turned-up ends of the main body ply extends beyond the bead filler strip.

U.S. Pat. No. 3,841,378 also attempts to provide a solution to the excess stress occurring in the bead region of a tire adjacent the steel rim by providing a reinforcement of rubberized fleece material fibers in this area. U.S. Pat. No. 4,261,405 is of some interest in respect to the present invention in that it discloses a tire in which the turn-up end extends a substantial distance along the side wall of the tire and includes a bead filler between the turn-up ends of the body ply and the main body ply in the side wall area. However, the body ply is formed of stranded cord material and not low twist yarn. U.S. Pat. No. 4,202,393 discloses another tire which attempts to provide increased durability to the tire by reducing the stress in the side wall and bead area by providing a bead filler located within a separate side wall reinforcing layer of cord material.

The main incentive to utilize low twist yarn in the body ply for tires is for cost reduction. As the twist level of yarn is decreased, textile manufacturing steps are shortened or eliminated. Changes in twist level also alter the geometry and mechanical behavior of the filament bundle. The main effects of using reduced twists in cords and yarns have been found to be a higher modulus, lower elongation, higher breaking strength, lower fatigue and abrasive resistance, and lower adhesion pullout force from a substrate.

Low twist cords and yarns have been tested as direct replacements for conventional tire body cords (10×10-12×12) in an attempt to achieve the advantage of the low twist yarn. However, the performance of these tires was unsatisfactory due to the lower side wall flex breaks that initiated within the turn-up ply. These failures were attributed to the inherent reduced fatigue resistance of low twist cords and yarns.

Analysis of tires that failed from lower side wall flex breaks showed that the flex break began as filament structure of the turn-up ply in the lower side wall due to compressional fatigue followed by crack growth through the turn-up and bead filler and finally crack propagation through the sidewall. Thus, a standard tire has to be redesigned in order to reduce the increased fatigue that is inherent in a tire using a low twist yarn.

Body ply turn-up undergoes cyclic loading as the tire goes in and out of the footprint and experiences lateral loads (i.e., cornering). This cyclic loading action is undesirable for the cords in a tire when the load cycle goes from tension to compression. This condition can be tolerated within limits with high twist cords. However, it is generally unacceptable for low twist yarns in the range of between 3 and 4 turns-per-inch. Because of the processing and material cost savings afforded by low twist yarns, a tire construction able to use such low twist yarn while providing the same resistance and durability to such cyclic loading as provided by body ply using high-twist cords is desirable.

The use of a low twist yarn and cords in the construction of pneumatic tires has been known in the art as shown in U.S. Pat. Nos. 2,273,200 and 2,309,564. However, the particular tire construction with which these low twist yarns or cords are used are completely different from that of the present invention, which provides a combination of elements that enables low twist yarn to be used in radial ply tires by overcoming the inherent lower fatigue resistance of such yarn.

Furthermore, in addition to developing a tire using a body ply formed of low twist yarn, it is desirable that the tire body ply be comprised only of parallel aligned cords or twisted yarn without the connecting pick or weft threads since it achieves increased uniformity. Therefore, it is desirable to develop a tire having a particular side wall design in which the stresses in the turn-up ply can be reduced or redistributed when using low twist yarn since tests show that tire durability decreases to unacceptable levels as body cord twist level decreases, and that the majority of failures are due to lower side wall flex breaks that initiated within the turn-up ply. Thus there is a need for a tire design, the parameters of which reduce or redistribute compressional forces in the lower turn-up region of the tire, and which have applicability to production building methods. Although the prior art has recognized the problems attempted to be solved by the following disclosure, the various combinations and arrangements of the ply material, bead filler hardness, height, and width which are set forth herein and which achieves the desired advantages, are not shown, suggested or obvious in view of the known prior art.

DISCLOSURE OF THE INVENTION

Objectives of the invention include providing an improved tire construction which utilizes low twist body ply yarn in a radial tire which reduces the fatigue and cyclic stress in the areas of the side wall which experiences the high degree of stress and cyclic motion by a unique combination of tire construction parameters; namely, the relationship of the low twist body ply yarn with the bead filler size and hardness. A further objective is to provide a tire construction in which the turn-up ends of the body ply extends a distance approximately 50% of the tire section height which is beyond the zone of severe stress and oscillation; in which the bead filler has a generally triangular configuration of a relatively narrow and long shape whereby the height of the bead filler is approximately 35% of the height of the tire section measured from the base of the filler which is located adjacent the bead core; and in which the bead filler has a maximum width of approximately 7% of the bead filler height.

Another objective of the invention is to provide such an improved tire construction in which the bead filler is of a high hardness being in the range between 75 and 98 on the Shore "A" scale with the preferred hardness being about 90. A still further objective is to provide such a tire construction in which the bead core is formed by a plurality of spaced wire strands arranged in a layer form in the range of between 3 and 5 strands per layer in a 4 to 7 layer height measured in the radial direction; and in which the low twist yarn is in the range of between 1500 and 3500 denier and preferably is formed of nylon or polyester material.

A further objective is obtained by the tire construction in which the low-twist body ply yarns are arranged in a generally parallel relationship with respect to each other and preferably are not connected by transverse threads, commonly referred to as pick or weft strands. This unique combination of tire construction parameters has been found to result in a passenger tire which has increased durability and uniformity at a lower cost. This is due to the use of the low twist yarn in the body ply in combination with a low turn-up height wherein the yarn is free of connecting pick or weft strands.

These objectives and advantages are obtained by the improved pneumatic tire construction of the invention, the general nature of which may be stated as including a pneumatic tire of the type having a tread portion, a pair of side wall portions, a pair of bead portions located below the side wall portions which include an annular bead core and a generally triangular-shaped bead filler, and a body ply structure extending circumferentially about the tire and being turned-up around the bead portion from the inside to the outside and terminating in a turn-up end portion above the apex of the bead filler, said improvement being characterized by the body being formed of a low twist yarn having between 2 and 5 turns-per-inch; the turn-up end portions extending along the side wall portions a distance between 35% and 65% of the tire section height; and the bead filler consisting of a high hardness rubber having a Shore A hardness of between 75 and 98 and a height of between 20% and 50% of the tire section height and a maximum base width of between 5% and 25% of the bead filler height.

BRIEF DESCRIPTION OF THE DRAWINGS

A preferred embodiment of the invention, illustrative of the best mode in which applicants have contemplated applying the principles is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
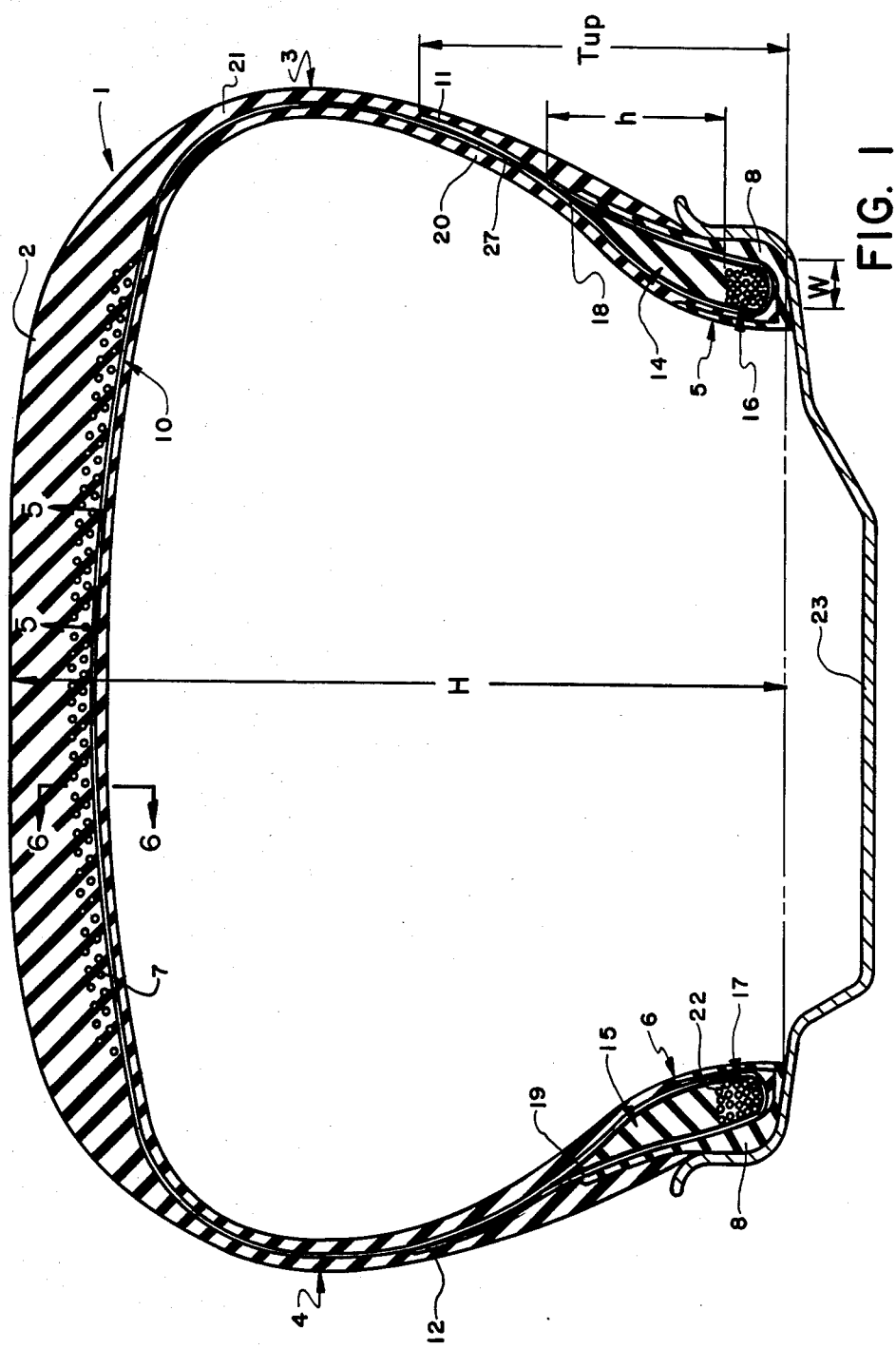
FIG. 1 is a cross sectional view of a tire made in accordance with the present invention and mounted on a rim.

The improved tire construction is shown in a half section in FIG. 1 and is indicated generally at 1, and includes a tread portion 2, a pair of side wall portions 3 and 4 extending radially inwardly from the axially outer edges of tread portion 2 and terminating in a pair of bead portions indicated generally at 5 and 6. As in a typical radial ply tire, a twoply strip or belt of reinforcing material 7, as for example of steel cord construction, extends along the top portion of the tire adjacent tread 2 and extends generally outwardly to adjacent the end of the tread portion.

In accordance with one of the main features of the invention, an improved body ply indicated generally at 10, extends circumferentially about the tire from and about each portion 5 and 6. Body ply 10 is turned up around both bead portions from the inside to the outside and terminates in turn-up end portions 11 and 12. Furthermore, in accordance with another of the important features of the invention, bead portions 5 and 6 include relatively high and narrow bead fillers, indicated generally at 14 and 15, which extend circumferentially from bead cores 16 and 17. Bead fillers 14 and 15 are strips of rubber generally triangular-shaped in cross section when in the "green" or unmolded state and are formed generally by extrusion methods. Apexes 18 and 19 of bead fillers 14 and 15 terminate below the ends of turn-up end portions 11 and 12 of body ply 10. Abrasion gum strips 8 preferably are molded with the finished tire and are located adjacent each flange of wheel rim 23 as shown in FIG. 1. No additional reinforcing strips are required in the bead or side wall area as in many prior art tire constructions.

Figure 4:
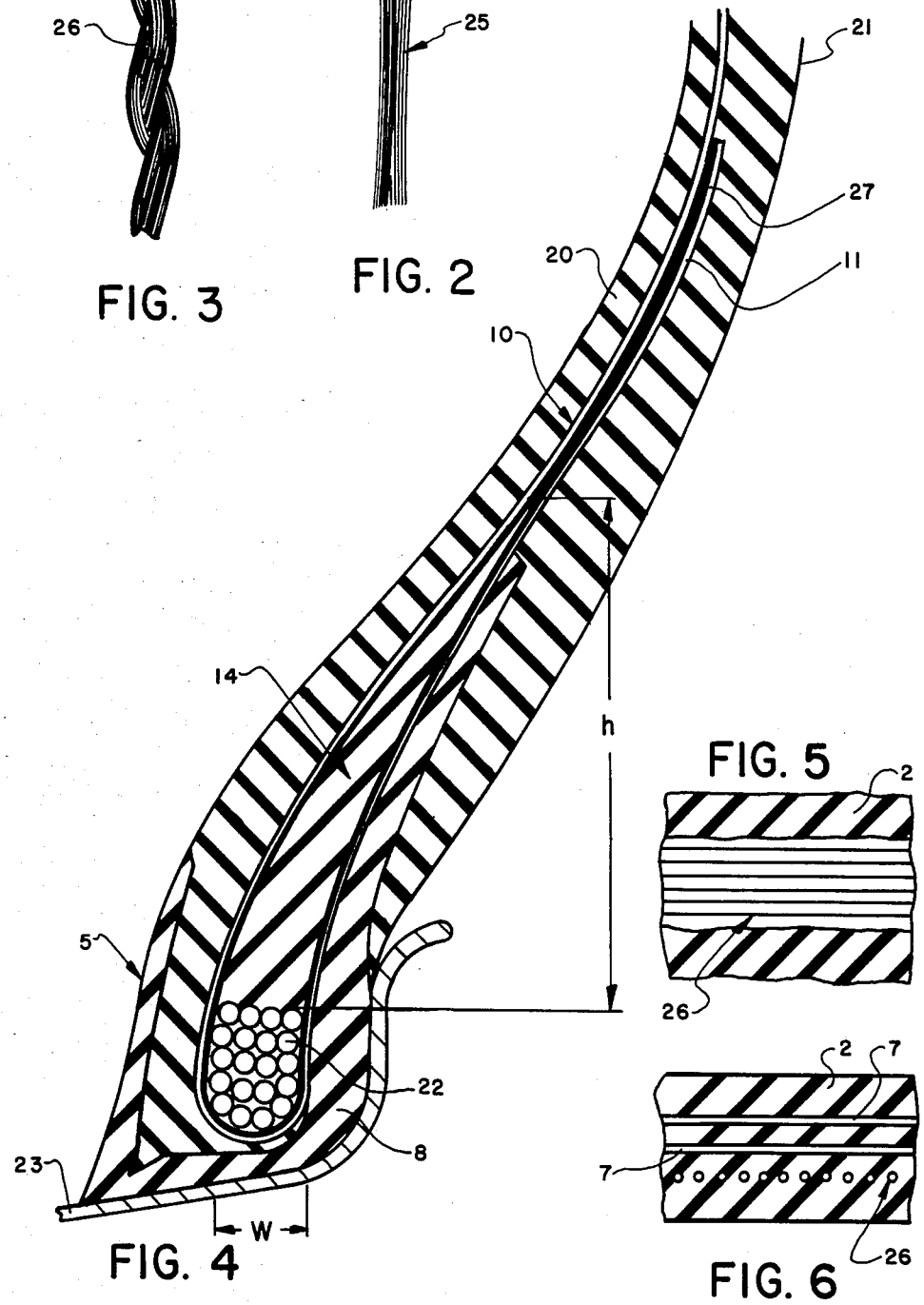
FIG. 4 is an enlarged fragmentary sectional view of the bead portion of the tire.

Reinforcing strip 7, body ply 10, and bead portions 5 and 6 are all contained within integrally formed inner and outer rubber casings indicated generally at 20 and 21, which form tread 2 and side walls 3 and 4. Side walls 3 and 4 may be formed integrally with tread portion 2 as shown in the drawings or may be separate molded components formed separately during the manufacture of the tire. The thickness of rubber indicated at 27, located between the apexes of the bead filler and the terminal ends of turn-up ends 11 and 12 as shown in FIG. 4, is the rubber coating applied to the yarn when forming body ply 10.

In accordance with one of the features of the invention, body ply turn-up end portions 11 and 12 terminate at a height which is approximately 50% of the tire section height (H). For example, in the preferred embodiment of a nominal 14 inch passenger tire, the tire section height is 5.77 inches with the turn-up height being approximately 3.0 inches, as indicated by designation (Tup) in FIG. 1. This turn-up height may vary approximately 15% from the preferred height and still achieve satisfactory results thereby providing turn-up end portions which extend along the side wall portions a distance of between 35% and 65% of the section height.

It has been determined that when such a relatively high turn-up end is provided for the body ply, which substantially removes the ending from within the severe oscillation and flexing area of a radial tire, bead fillers 14 and 15 should have relatively elongated and narrow configurations and be formed of a high hardness rubber. The configuration and dimension of bead fillers 14 and 15 have been found to be most effective with a height (h) of approximately 35% of the tire section height and a width (w) of approximately 7% of the bead filler height and with a Shore A hardness of 90. Again, these relationships can be varied from the preferred amounts and still provide a satisfactory tire construction. Bead filler thickness (w) can vary within the range of between 5% and 25% of the bead filler height (h). Also, this bead height can vary approximately 15% providing a height of between 20% and 50% of the tire section height and still provide a satisfactory tire construction which achieves the desired results of the invention.

In conjunction with this relatively narrow bead filler, bead cores 16 and 17 likewise will be relatively narrow. Cores 16 and 17 are formed of a plurality of individual wire strands 22 arranged in generally horizontal layers consisting of between 3 and 5 wire strands per layer and between 4 and 7 layers high. In the preferred embodiment as shown in FIG. 1, the bead core is formed four strands wide and five layers high containing a total of 20 wire strands. The number of strands per layer height will vary generally proportional with the thickness of the base of the bead filler.

This particular combination of tire parameters results in a tire achieving superior durability and uniformity at a reduced cost primarily due to the use of the low twist yarn in the range of two to five turns per inch in forming main body ply 10, and in the preferred embodiment being formed with three turns per inch. This increased durability is achieved even though the low twist yarn has lower fatigue and lower abrasion resistance if used as a direct substitution for the body ply twisted cord in a standard tire.

Figure 2:
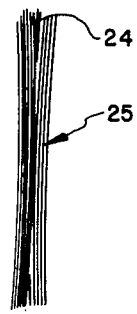
FIG. 2 is an enlarged fragmentary generally diagrammatic view of a section of untwisted yarn of the type used for forming the body ply.

This low-twist yarn which achieves the cost savings of improved tire construction 1 consist of a plurality of individual fibers 24 as diagrammatically illustrated in FIG. 2. These fibers preferably are formed of Nylon which is coated and treated in a usual manner as when used for twisted cord ply body constructions. Other types of synthetic strand material can be used instead of Nylon, such as polyester without effecting the advantage achieved by the improved tire construction. These individual fiber are arranged in bundles 25 and are formed into the low-twist strand configuration 26 shown diagrammatically in FIG. 3 preferably at three turns-per-inch. The three turns-per-inch provides the most effective results when combined with the other parameters discussed above. Although two to five turns-per-inch will provide satisfactory results, the three turns-per-inch is believed to be the most efficient. In the preferred embodiment, the particular yarn used was Nylon 66 with a denier of 2520, a breaking strength of 53 lbs., and a 6.8% elongation at 15 test lbs. The denier of the yarn also can vary within the range of 1500 and 3500.

Figure 3:
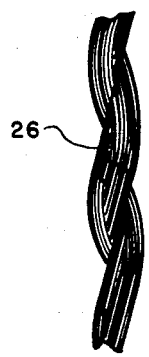
FIG. 3 is a fragmentary diagrammatic view of a section of the yarn of FIG. 2 formed into the low twist configuration from which the body ply is constructed.
Figure 5:
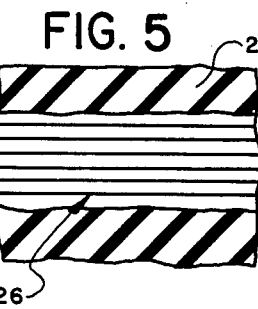
FIGS. 5 and 6 are enlarged fragmentary views with portions broken away and in section, taken on FIG. 1 showing the low-twist yarn of the body ply molded within the tread area of the tire.
Figure 6:
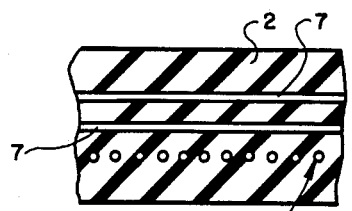

As shown in FIGS. 5 and 6, body ply 10 is formed by a plurality of individual low twist yarn strands 26 of the type shown in FIG. 3 which are arranged in a parallel relationship, preferably without any transversely connecting weft or pick strands as in most prior radial pneumatic tire constructions. The elimination of these transverse strands provides a more uniform body ply.

The increased durability of such a tire was proven by a series of tests performed on a plurality of tires constructed with the preferred parameters set forth above as well as on various modifications of such a tire construction with certain of the parameters being changed.

Three tires each of five different experimental tire groups having various parameter changes were tested for endurance against a standard control tire which was a modified model P195/75R14, in which the usual body ply high twist (10×10) polyester cord was replaced with a body ply formed of low twist (three turns-per-inch) yarn of Nylon. The various parameters of the five experimental tire groups tested with respect to the control tire are set forth below in TABLE 1.

configuration in TABLE 1 is indicated as width x height.

Accordingly, the improved pneumatic tire construction is simplified, provides an effective, safe, less expensive, and efficient tire which achieves all the enumerated objectives, provides for eliminating difficulties encountered with prior tires and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved tire construction utilizing low-twist body ply yarn with high turn-up ends is constructed, the characteristics of the construction, and the advantageous, new

TABLE 1

| PARAMETERS | Control | Exp. No. 1 | Exp. No. 2 | Exp. No. 3 | Exp. No. 4 | Exp. No. 5 |
| --- | --- | --- | --- | --- | --- | --- |
| Bead Filler Hardness | 80 | 80 | 80 | 90 | 90 | 90 |
| Bead Filler Height | 1.50" | 2.00" | 2.00" | 2.00" | 2.00" | 2.00" |
| Bead Filler Width | .28" | .13" | .43" | .13" | .43" | .43" |
| Bead Configuration | 5 × 4 | 4 × 5 | 6 × 4 | 4 × 5 | 6 × 4 | 6 × 4 |
| Turn-up Ply Height | 3.0" | 3.0" | 3.0" | 3.0" | 3.0" | 1.0" |
| Turns-per-inch | 3 | 4 | 4 | 3 | 4 | 4 |
| Average Endurance Miles Before Failure | 4552 | 3633 | 3612 | 6783 | 4367 | 7257 |

As can be seen from TABLE 1, three control tires using a body ply formed of a Nylon having three turns-per-inch failed after an average of 4552 miles. The failure of the three test tires of Experimental Group No. 3 did not occur until an average of 6783 miles. This was an improvement of almost 50% over the mileage achieved by the test tire containing the three turns-per-inch low twist Nylon yarn with the parameters remaining the same as in the control tire. The average mileage before failure of three control tires containing the usual ply twist cord fabric body, was 5180 miles. Thus, improved tire construction 1 (Experimental Group No. 3) showed an average increase in endurance of over 30% over the standard passenger tire. The three experimental tires of Group No. 1 failed at an average of 3633 miles due to flex break. The three experimental tires of Group No. 2 failed at an average of 3162 miles due to flex break. The average of three experimental tires of Group No. 4 failed at an average of 4367 miles due to flex break, and the average of three test tires in Experimental Group No. 5 failed at an average of 7257 miles. The improved tire construction of Group No. 5 is covered by our copending patent application Ser. No. 675,164 filed concurrently herewith.

The tires of Experimental Group Nos. 1, 2, 4, and 5 had a body ply of four turns-per-inch and were formed of a polyester yarn. Thus, the test showed the superior endurance obtained by the improved tire construction of the invention having the various parameters set forth above, and that such improved results were not obtainable merely by replacing the high twist cord body ply with low twist yarn without modifying certain of the parameters in accordance with the invention. The bead and useful results obtained; and the new and useful combination of parameters, are set forth in the appended claims.

What is claimed is:

1. An improved pneumatic tire of the type having a tread portion, a pair of side wall portions, a pair of bead portions located below the side wall portions which include an annular bead core and a generally triangular-shaped bead filler, and a body ply structure extending circumferentially about the tire and being turned-up around the bead portions from the inside to the outside and terminating in a pair of turn-up end portions adjacent the bead filler, said improvement being characterized by:

(a) the body ply being formed of a low twist yarn having between 2 and 5 turns-per-inch;
   (b) the turn-up end portions extending along the side wall portions a distance of between 35% and 65% of the tire section height;
   (c) the bead filler consisting of a high hardness rubber having a Shore A hardness of between 75 and 98, a height of between 20% and 50% of the tire section height, and a maximum base width of between 5% and 25% of the bead filler height; and
   (d) said side wall portions between the tread portion and bead portion being free of any additional textile or metal reinforcement except that provided by the body ply structure.

2. The improved tire defined in claim 1 in which the bead core is formed by a plurality of wire strands arranged in a layered relationship with the top layer being located immediately adjacent to and generally parallel with the base of the bead filler and consisting of between 3 and 5 strands per layer; and in which said core contains between 4 and 7 layers of said strands.

3. The improved tire defined in claim 1 in which the yarn has 3 turns-per-inch and is formed of Nylon fibers.

4. The improved tire defined in claim 3 in which the turn-up end of the body ply extends to a height of approximately 50% of the tire section height; and in which the bead filler height is approximately 35% of the tire section height and has a width of approximately 7% of the bead filler height.

5. The improved tire defined in claim 4 in which the bead filler has a Shore A hardness of approximately 90.

6. The improved tire defined in claim 1 in which the yarn is within the range of 1500–3500 denier.

7. The improved tire defined in claim 6 in which the yarn is approximately 2520 denier.

8. The improved tire defined in claim 1 in which the low twist yarn of the body ply includes a plurality of generally parallel strands; and in which said strands are free of any transversely extending weft strands connecting said parallel strands.

9. The improved tire defined in claim 1 in which gum abrasion strips are disposed outwardly of the bead portions and extend about the bases of said bead portions and about portions of the turn-up ends of the body ply.

* * * * *